(12) United States Patent
Wobben (10) Patent No.: US 7,752,825 B2
(45) Date of Patent: Jul. 13, 2010

(54) TOWER MADE OF PRESTRESSED CONCRETE PREFABRICATED ASSEMBLY UNITS

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 11/473,863

(22) Filed: Jun. 22, 2006

(65) Prior Publication Data
US 2006/0254168 A1     Nov. 16, 2006

Related U.S. Application Data

(62) Division of application No. 10/332,690, filed on Sep. 30, 2003, now Pat. No. 7,114,295.

(51) Int. Cl.
E04C 2/38     (2006.01)

(52) U.S. Cl. ............... 52/848; 52/58; 52/223.5; 52/396.04

(58) Field of Classification Search ............ 52/58, 52/396.03, 396.04, 396.05, 721.2, 831, 834, 52/835, 848, 855, 223.1, 223.3, 223.4, 223.5, 52/223.9, 318, 61, 63, FOR. 101, FOR. 102, 52/FOR. 116, FOR. 117, FOR. 118; 277/608
See application file for complete search history.

(56) References Cited

U.S. PATENT DOCUMENTS

| | | | |
|---|---|---|---|
| 1,567,301 A | 12/1925 | Ross ....................... 52/40 |
| 1,723,216 A | 8/1929 | Stam | |
| 2,064,791 A | 12/1936 | Faber | |
| 2,413,268 A | 12/1946 | Unverferth ............... 72/106 |
| 2,826,800 A | 3/1958 | Van Buren ............... 25/118 |
| 3,180,570 A | 4/1965 | Grabowski ............... 230/254 |
| 3,504,500 A | 4/1970 | Fristedt .................... 61/53 |
| 3,606,666 A | 9/1971 | Briggs, Jr. | |
| 3,666,606 A | 5/1972 | Stokes ...................... 161/37 |
| 3,721,056 A | 3/1973 | Toan | |
| 3,967,421 A | 7/1976 | Dufossez .................. 52/146 |
| 3,977,137 A * | 8/1976 | Patry ........................ 52/60 |
| 4,272,929 A | 6/1981 | Hanson .................... 52/40 |
| 4,333,660 A * | 6/1982 | Cupit ....................... 277/630 |
| 4,386,172 A | 5/1983 | Yoshioka et al. ......... 523/408 |

(Continued)

FOREIGN PATENT DOCUMENTS

DE     1 038 743     9/1958

(Continued)

*Primary Examiner*—Richard E Chilcot, Jr.
*Assistant Examiner*—William V Gilbert
(74) *Attorney, Agent, or Firm*—Seed IP Law Group PLLC (57) ABSTRACT

The invention concerns a method of erecting a pylon of prestressed concrete finished parts and an apparatus for advantageously carrying out the method. In order to at least reduce the problems present in the state of the art when erecting a pylon, there is provided a funnel-shaped apparatus 8 for guiding a tensioning wire, the smaller cross-section 11 thereof being substantially the same as that of the jacket tube 7. There is further provided a seal 20 for producing a pressure-tight transition between two mutually superposed segments 4, 6, wherein the height of the seal 20 substantially corresponds to the intended spacing of the segments. Also provided is a prestressed concrete finished part 4, 6 in which the apparatus 8 according to the invention is integrated. Finally there is provided a method in which epoxy resin is used as a composite joining material 34 between two segments.

18 Claims, 6 Drawing Sheets

U.S. PATENT DOCUMENTS

| | | | |
|---|---|---|---|
| 5,029,879 A * | 7/1991 | Strang et al. | 277/606 |
| 5,176,408 A * | 1/1993 | Pedersen | 285/42 |
| 5,555,697 A | 9/1996 | Kim | 52/741.1 |
| 5,666,774 A | 9/1997 | Commins | |
| 5,771,518 A | 6/1998 | Roberts | |
| 5,860,256 A * | 1/1999 | Humber | 52/219 |
| 5,934,035 A | 8/1999 | Rasmussen et al. | 52/300 |
| 5,944,323 A * | 8/1999 | Cavka | 277/626 |
| 6,185,885 B1 * | 2/2001 | Thaler | 52/219 |
| 6,381,912 B1 | 5/2002 | Sorkin | 52/223.13 |
| 6,389,764 B1 | 5/2002 | Stubler et al. | 52/220.8 |
| 7,114,295 B2 | 10/2006 | Wobben | 52/40 |

FOREIGN PATENT DOCUMENTS

| | | |
|---|---|---|
| DE | 6 905 988 | 7/1969 |
| DE | 298 09 541 U1 | 10/1999 |
| DE | 198 23 650 A1 | 12/1999 |
| FR | 1 249 458 | 11/1959 |
| FR | 2 775 492 | 9/1999 |
| FR | 2 783 266 | 3/2000 |
| JP | 50-133652 | 10/1975 |
| JP | 60-15518 | 2/1985 |
| JP | 1-147005 | 10/1989 |
| JP | 41-18266 | 10/1992 |
| JP | 5-346052 | 12/1993 |
| JP | 6-101348 | 4/1994 |
| JP | 6-34014 | 5/1994 |
| JP | 10-205428 | 8/1998 |
| JP | 11-29911 | 2/1999 |
| JP | 11-172964 | 6/1999 |
| WO | WO 86/02689 | 5/1986 |
| WO | WO 99/43910 | 9/1999 |

* cited by examiner

TOWER MADE OF PRESTRESSED CONCRETE PREFABRICATED ASSEMBLY UNITS

CROSS-REFERENCE TO RELATED APPLICATION

This application is a divisional of, and claims priority to, U.S. patent application Ser. No. 10/332,690 filed Sep. 30, 2003 now U.S. Pat. No. 7,114,295. Further, this application claims priority to German Application No. 100 33 845.3 filed on Jul. 12, 2000.

TECHNICAL FIELD

The present invention concerns a method of erecting a pylon of prestressed concrete finished parts and an apparatus for advantageously carrying out the method. Pylons of prestressed concrete finished parts are generally known and are used for the most widely varying range of purposes. As an example here mention may be made of use thereof as an antenna carrier for telecommunication equipment.

BACKGROUND OF THE INVENTION

The use of restressed concrete finished parts, in comparison with erecting towers or pylons with a climbing or sliding concrete form or sheathing, has the advantage of an economically more favorable possible way of producing the finished parts, under predetermined conditions. In that way, a large part of the work involved can already be carried out far from the building site. In addition it is in that way better possible to satisfy predetermined quality requirements and to monitor the procedure to ensure that such requirements are met, and the pylon can then be erected on the building site in a short time.

For that purpose the prestressed concrete finished parts are assembled with jacket tubes, incorporated into the pylon wall, for the tensioning means, on the building site. In that case, to connect the individual finished parts together as segments of the pylon, a concrete mix is introduced into the joins between the segments in order to achieve a force-locking connection, over a surface area, between the finished parts. The tensioning means which are pulled into the jacket tubes are then tensioned and thereafter the jacket tubes are filled with a concrete slurry under high pressure and pressed in order to produce an intimate connection between tensioning means and pylon.

The operation of pressing the tensioning means in the jacket tubes must be effected under high pressure so that the concrete slurry can rise in the jacket tubes and fill them to the tip of the pylon, with the required pressure. That required pressure can certainly attain values of 200 bars, in the case of pylons which are 80 m high. In that respect it will be noted that the state of the art involves the problem that the concrete slurry which is under high pressure can escape at the junctions between the individual segments as the concrete therebetween is brittle and porous as a consequence of its material properties and therefore the transition between the segments is not reliably sealed off.

Therefore it may be necessary to provide an access for the injection of the concrete slurry, beginning with the lowermost segment and moving upwardly on the tower, at each junction between mutually superposed segments, and to feed the concrete slurry at such access points in order to press the jacket tubes of the respective segment disposed thereabove.

In Germany tensioning bars and tensioning wires are considered as tensioning means. The use of tensioning bars however is subject to the limitation that they can be used exclusively when dealing with straight tensioning paths. This means however that the options in terms of the contour of a tower comprising prestressed concrete finished parts are limited when using tensioning bars as they always have to be in a straight line. This means that the erection of a conical pylon with tensioning bars is possible as long as the cross-section of the pylon tapers in a rectilinear configuration.

Therefore only the use of a tensioning wire is considered for the purposes of erecting a conical pylon with a curved contour. The tensioning wire is pulled in either from the tip of the pylon into the jacket tubes of the segments continuously down to the base of the pylon or from the base of the pylon continuously up to the tip of the pylon. That procedure however suffers from the problem that the tensioning wire, from the tip of the pylon to the base region thereof along the curved contour, has to pass over the junctions between the individual segments. As a consequence of the curvature however, there is always the danger that the wire does not follow the curvature in particular at such a junction, but becomes jammed at the junction and can be moved along only at great cost.

SUMMARY OF THE INVENTION

One object of the present invention is to provide a method of erecting a pylon of prestressed concrete finished parts and an apparatus for advantageously carrying out the method, by means of which the above-identified problems in the state of the art are eliminated or at least alleviated.

For that purpose, in accordance with the invention, there is provided an apparatus which is of a funnel-shaped configuration. In that arrangement the side of the funnel-shaped apparatus of the smaller cross-section is of a cross-section which substantially corresponds to the cross-section of a jacket tube, as is incorporated into the segments. The funnel-shaped apparatus is provided above a jacket tube and is oriented towards the jacket tube, with the side of the smaller cross-section. As a result a tensioning wire which is pulled in from the tip of the pylon or tower firstly reaches the side of the larger cross-section and is guided thereby to the smaller cross-section. As that smaller cross-section substantially corresponds to the cross-section of a jacket tube, the tensioning wire thus passes smoothly into the jacket tube of the next segment disposed therebeneath.

In a preferred embodiment of the invention mounted at the side of the apparatus of the smaller cross-section is a tubular portion of substantially equal cross-section. That portion is of a predetermined length which on the one hand is such that it can securely engage into the jacket tube but on the other hand the material expenditure and thus the costs remain within acceptable limits.

In a particularly preferred embodiment of the invention the tubular portion and the apparatus are formed in one piece and are provided in the region of the tubular portion with a male screwthread with which it can be screwed into the jacket tube. That arrangement makes it possible to produce a particularly simple and secure connection between the funnel-shaped apparatus and the jacket tube.

The apparatus is particularly preferably so designed that provided at the outer periphery is a mounting option for for example a seal. The mounting option can completely surround the outer edge of the apparatus and thus contribute to securely holding the seal in place.

In order to counteract the problem of the concrete slurry escaping in the operation of pressing the jacket tubes, in accordance with the invention there is provided a seal which is inserted between two segments where the jacket tubes in the segments are in mutually opposite relationship. The seal is of a height which corresponds at least to the intended spacing of the segments in order to achieve a sealing action.

In a particularly preferred embodiment of the invention the seal is higher than the predetermined spacing between the segments, by more than the measurement of surface roughness.

As the seal and the funnel-shaped apparatus are provided at positions on the periphery of the segments, at which the incorporated jacket tubes are in opposite relationship, the seal is preferably of the same cross-sectional shape as the funnel-shaped apparatus.

In a particularly preferred feature the internal width of the seal increases towards the segment which is arranged below it, while the side of the seal, which faces towards the segment arranged above the seal, is at least of the same size of the cross-section in respect of its internal width, as that of the jacket tubes in the segment. That affords a cross-sectional enlargement in the seal towards the funnel-shaped apparatus so that the advantage thereof can be fully utilized.

In a further preferred embodiment of the invention the outer peripheral surface of the seal substantially follows the variation in the internal width and therefore decreases in a direction towards the smaller cross-section. As a result that region of the seal wall, as the upper portion of the seal, remains sufficiently deformable and is pressed outwardly and thus against the adjacent segment by pressure which occurs within the seal.

The transition between the inner wall and the outer wall of the upper portion of the seal is such that it extends at an acute angle relative to the outer wall and an obtuse angle relative to the inner wall and thus substantially vertically.

As a result, even when the upper portion of the seal is pressed down horizontally, at the transition between the inner and outer walls, there is a force which presses the seal with its upper portion more firmly against the segment because in that situation the transition still has an upwardly extending surface.

In a particularly preferred embodiment of the invention formed at the underside of the seal, the side of the larger cross-section, is a bead or ridge which in respect of its dimensions and its shape corresponds to the mounting means provided on the funnel-shaped apparatus, for receiving a seal. In that way the seal can be securely held in position, thereby preventing the seal from slipping and ensuring that the assembly procedure is not adversely affected.

In a preferred development the seal according to the invention has a peripherally extending cantilever portion which is directed outwardly, at the outer periphery of the seal, above the bead. That cantilever portion is of a predetermined height and width and projects by that dimension beyond the upper peripherally extending edge of the apparatus. That cantilever portion on the one hand increases the flexural stiffness of the bead which is accommodated in the apparatus and serves on the other hand as a barrier for a composite joining material between the segments in order to prevent that material from reaching the top side of the seal during erection of the tower or pylon.

In order to simplify the working procedure in particular on the building site, in accordance with a preferred embodiment of the invention the apparatus can already be integrated into the segment upon manufacture of the segments, in a suitably oriented condition. In that case, it is particularly preferably integrated in such a way that the top edge of the apparatus, that is to say the side of the larger cross-section, terminates flush with the top side of the segment.

In a further embodiment of the invention the form of the funnel-shaped apparatus is provided in the wall of the segment, during manufacture of the segments. In that way, with the same functionality, it is possible on the one hand to save on the material for the apparatus and on the other hand it is possible to save the working step involved in inserting the apparatus.

In order to avoid junctions only being displaced, the spacing between the opening of the apparatus, at the side towards the jacket tube, and the adjacent edge of the jacket tube, is negligibly small so that the funnel-shaped apparatus and the jacket tube blend into each other.

In order to reduce transportation and handling problems, a particularly preferred embodiment of the invention provides that each full segment is divided in parallel to its vertical axis into at least two sub-segments.

In a further, particularly preferred embodiment of the invention, when erecting the tower or pylon from segments, a polymer such as for example epoxy resin is used as the joining material between the segments, in place of the porous concrete. In the hardened condition that epoxy resin has the same strength properties as concrete, but it is not so porous and brittle, and it thus provides a mechanically equivalent and at the same time sealed connection between the segments.

In order to achieve a sufficiently secure connection between the segments, the joining material is preferably applied over the full surface area involved. It will be noted in that respect that the funnel-shaped openings and the openings of the jacket tubes are cleared out in order not to provide there any new barriers for the tensioning cable which is to be pulled in and for the concrete slurry.

In a particularly preferred embodiment of the invention there are provided at least three spacers which are inserted between the segments before the segments are assembled. They carry the respective segment which rests thereon until the joining material is hardened.

In that case the spacers are particularly preferably made from a material such as for example wood which has a lower modulus of elasticity that the hardened joining material. That provides on the one hand that the spacers suitably deform in the event of irregularities in the mutually facing surfaces of the segments and prevent parts of the wall of the segments from chipping off. On the other hand however after the joining material has hardened they bear the loadings and suitably carry them away, in place of the 'soft' spacers.

The modulus of elasticity of the spacers is preferably in a range of between 3000 N/mm$^2$ and 5000 N/mm$^2$ in order to be able to keep the required surface area of the spacers within limits, while the joining material preferably has a modulus of elasticity >5000 N/mm$^2$.

In a particularly preferred embodiment of the invention, the cooperation of the funnel-shaped apparatus, the seal and the joining material makes it possible, in the case of a tower or pylon consisting of segments, for the tensioning cables to be pulled into the jacket tubes and tensioned and then for for example a concrete slurry to be pressed into the jacket tubes from the base of the tower, under such high pressure that the concrete slurry rises as far as the tip of the tower or pylon without escaping at a junction between two prestressed concrete finished elements.

Advantageous developments of the invention are described in the appendant claims.

BRIEF DESCRIPTION OF THE FIGURES

An embodiment of the invention is described in greater detail hereinafter with reference to the accompanying drawings in which.

DETAILED DESCRIPTION OF THE INVENTION

Figure 1:
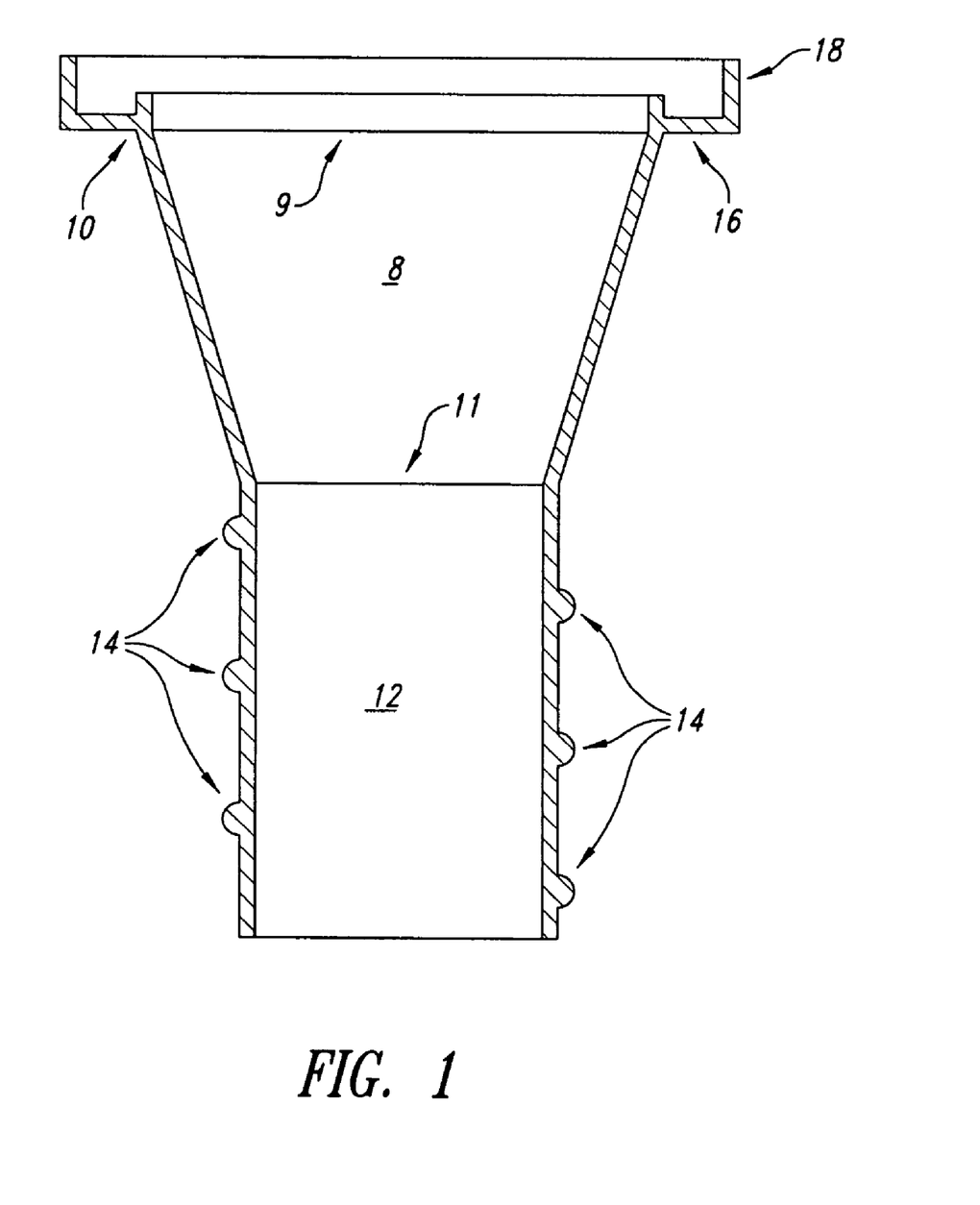
FIG. 1 shows a side view in cross-section of a funnel-shaped apparatus according to the invention.

FIG. 1 is a side view of a funnel-shaped apparatus 8 according to the invention for guiding a tensioning wire 13, as a sectional view. The cross-section in the plan view (not shown) in this embodiment is preferably round but it can also be polygonal, for example for introducing an aspect of preventing rotational movement.

The central part of the apparatus 8 is a funnel-shaped portion 8 with an upwardly facing opening 9 and a downwardly facing opening 11. The upwardly facing circular opening 9, with a cross-sectional area of about 254 cm$^2$, is of a larger inside diameter, at about 90 mm, than the downwardly facing opening 11 with an inside diameter of about 53 mm.

In this arrangement the smaller, that is to say downwardly facing cross-section 11 substantially corresponds to the cross-section of jacket tubes 7 which, during manufacture of the segments 4, 6, are integrated in the wall thereof and which are provided to receive the tensioning wires (or the tensioning bars). In that way, a tensioning wire which enters at the larger cross-section 9 can be guided through the funnel shape in such a way that it can pass smoothly into the jacket tube 7 which is in adjoining relationship beneath the funnel-shaped apparatus 8.

In the illustrated embodiment according to the invention a flare angle of about 40° was selected for the funnel-shaped apparatus 8. That flare angle can however vary over a wide range of between 10° and 150° in dependence on structural factors and aspects of the segments.

Adjoining the smaller opening 11 of the apparatus 8 is a tubular portion 12 provided with a male screwthread 14. The portion 12 can be screwed into a jacket tube 7 and thus on the one hand provides for accurate reproduceable positioning of the apparatus 8 and on the other hand provides for still more extensive guidance for the tensioning wire. In addition, this ensures that the apparatus 8 cannot become accidentally released from the jacket tube 7, independently of the transportation position.

The tubular portion 12 is of a cross-section which substantially corresponds to that of the jacket tube 7. It will be appreciated that in this embodiment it is slightly smaller so as to permit it to be screwed in.

The outer peripheral edge 10 at the larger cross-section 9 is prolonged about 7 mm upwardly, wherein in this region however the cross-section remains constant, that is to say the peripheral edge 10 extends vertically. Adjoining that peripheral edge 10 at the transition from the funnel-shaped portion 8 to the vertically extending part of the peripheral edge 10 is a substantially horizontally extending support surface 16 which extends in an annular configuration around the peripheral edge 10 and which for example can carry a seal element 20. The width of the support surface 16 depends on the support surface area required for the seal 20 and in the present embodiment is about 10 mm.

An additional peripherally extending edge portion 18 is in turn provided perpendicularly at the outer edge of the support surface 16 and extends about 10 mm upwardly from the support surface 16. That affords additional lateral support for a seal 20 which is to be inserted in that receiving means formed from the peripheral edge 10, the support surface 16 and the peripherally extending edge portion 18, such support effectively preventing the seal 20 from slipping.

In an alternative embodiment (not shown) of the invention the support surface 16 can extend at an acute angle relative to the peripheral edge 10. In a simpler design configuration, that arrangement can also provide an additional supporting action for a suitably shaped seal 20.

Figure 2:
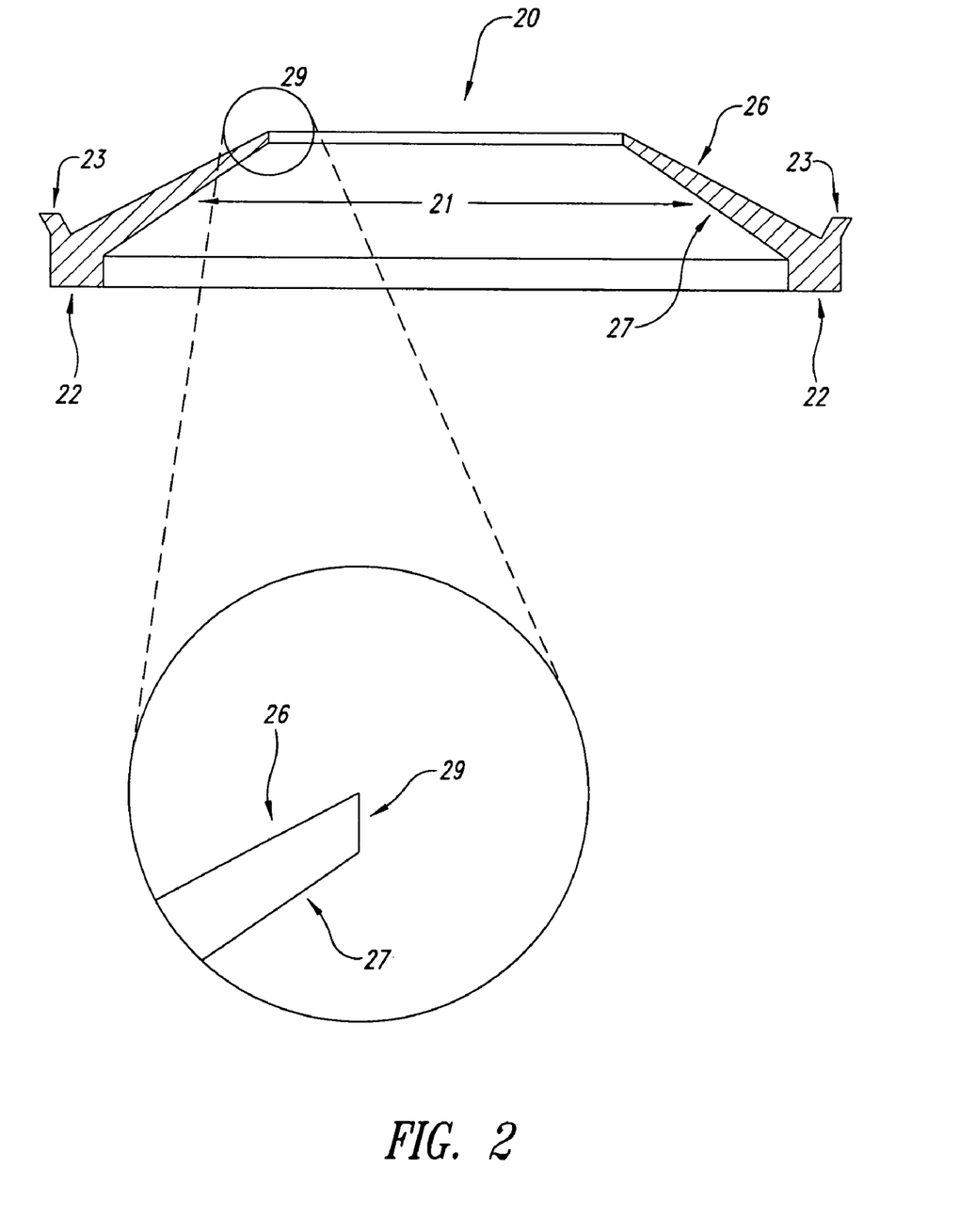
FIG. 2 shows a side view in cross-section of a seal according to the invention.

FIG. 2 shows a seal 20 according to the invention, in a first embodiment. In the plan view (not shown) the seal 20 is of a round cross-section, just like the apparatus 8. In the side view shown in cross-section, the seal 20 is of a varying internal width 21. That internal width 21 increases towards the lower edge of the seal 20. It will be noted in this respect that the diameter at the upper edge of the seal 20, at about 70 mm, is still larger than the inside diameter of jacket tubes 7 which are used as a standard, at about 60 mm. The inside diameter of the seal 20 is about 95 mm at its lower edge and thus corresponds to the outside diameter of the apparatus 8 at the outer peripheral edge 10 thereof.

In the region of the lower edge, the outer peripheral edge of the seal 20 is in the form of a bead or ridge 22, the dimensions of which, being a height of about 7 mm in the interior of the seal, about 10 mm in height at the outer periphery, and a width of also about 10 mm, are so selected that they correspond to the dimensions of the receiving means of the apparatus 8, which means is formed from the peripheral edge 10, the support surface 16 and the peripherally extending edge portion 18. The seal 20 therefore fits precisely into that receiving means on the apparatus 8 and an adhesive layer or the like can be provided between the apparatus 8 or the support surface 16 and the seal 20, for fixing the seal 20.

The internal width of the seal 20 decreases from the lower end to the upper end thereof. The outer periphery of the seal 20 follows that configuration. In other words, the outer periphery of the seal also decreases in the region of the seal above the bead 22. That affords the advantage that, when pressure occurs in the path of the tensioning wire and thus within the seal 20, namely when pressure is applied in the jacket tubes 7, that pressure can deform the seal 20, in particular in this region, and can press it against the upper segment 6 so that the transition between the segments 4, 6 (FIG. 3) in the region of the jacket tubes 7 is securely sealed off.

Above the bead 22 the seal 20 has at its outer periphery a circumferentially extending cantilever portion 23 which is of a parallelogram-shaped configuration. The cantilever portion 23 is of a height of about 5 mm and projects by that dimension beyond the upper peripherally extending edge 18 of the apparatus (8). The cantilever portion 23 on the one hand increases the flexural stiffness of the bead 22 accommodated in the apparatus 8 and on the other hand serves as a barrier for the composite joining material 34 (FIG. 3) between the segments 4, 6 in order to prevent the material 34 from passing on to the top side of the seal 20 during the operation of erecting the pylon.

Figure 3:
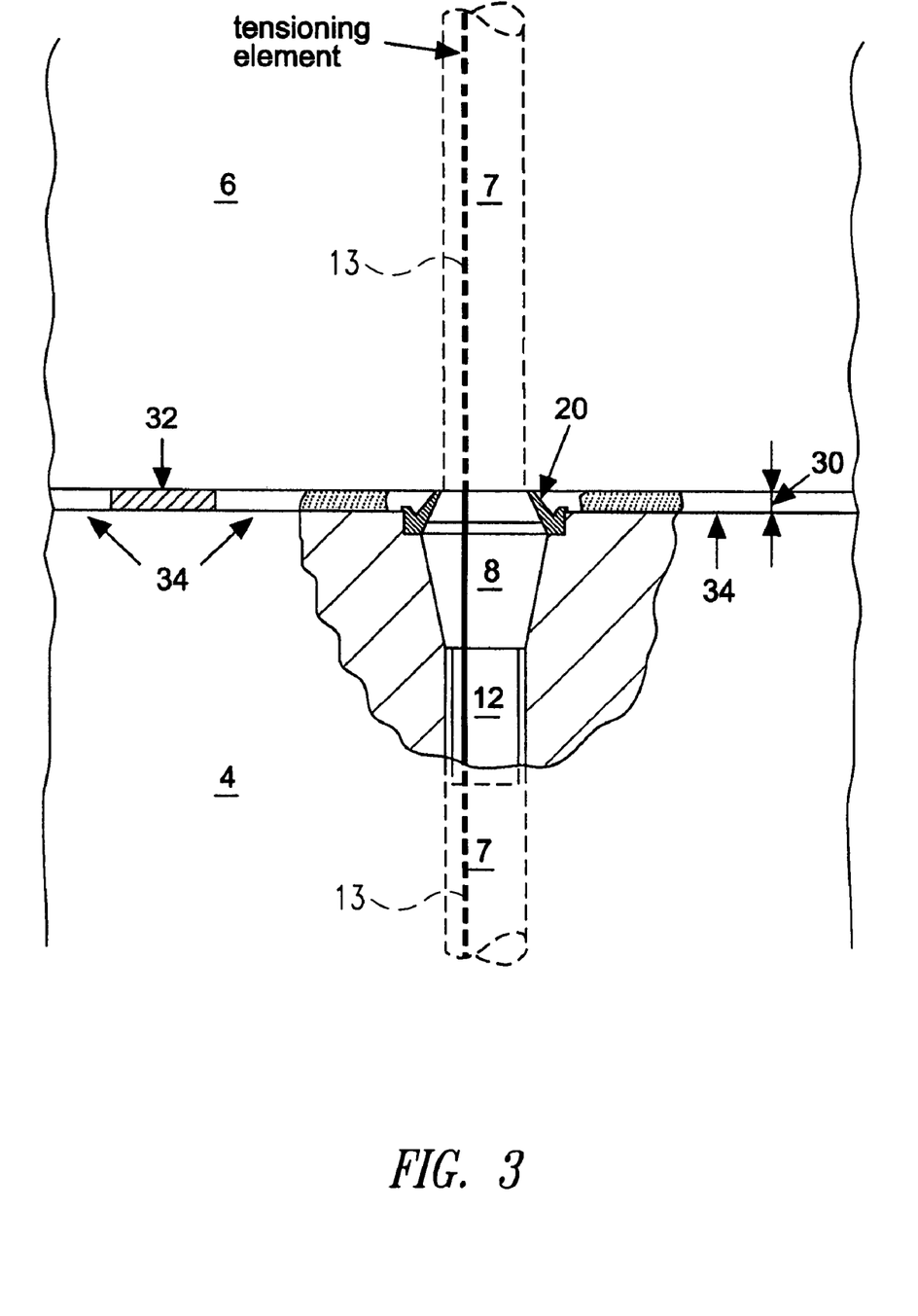
FIG. 3 shows a view on an enlarged scale of the transition in FIG. 2.
Figure 4:
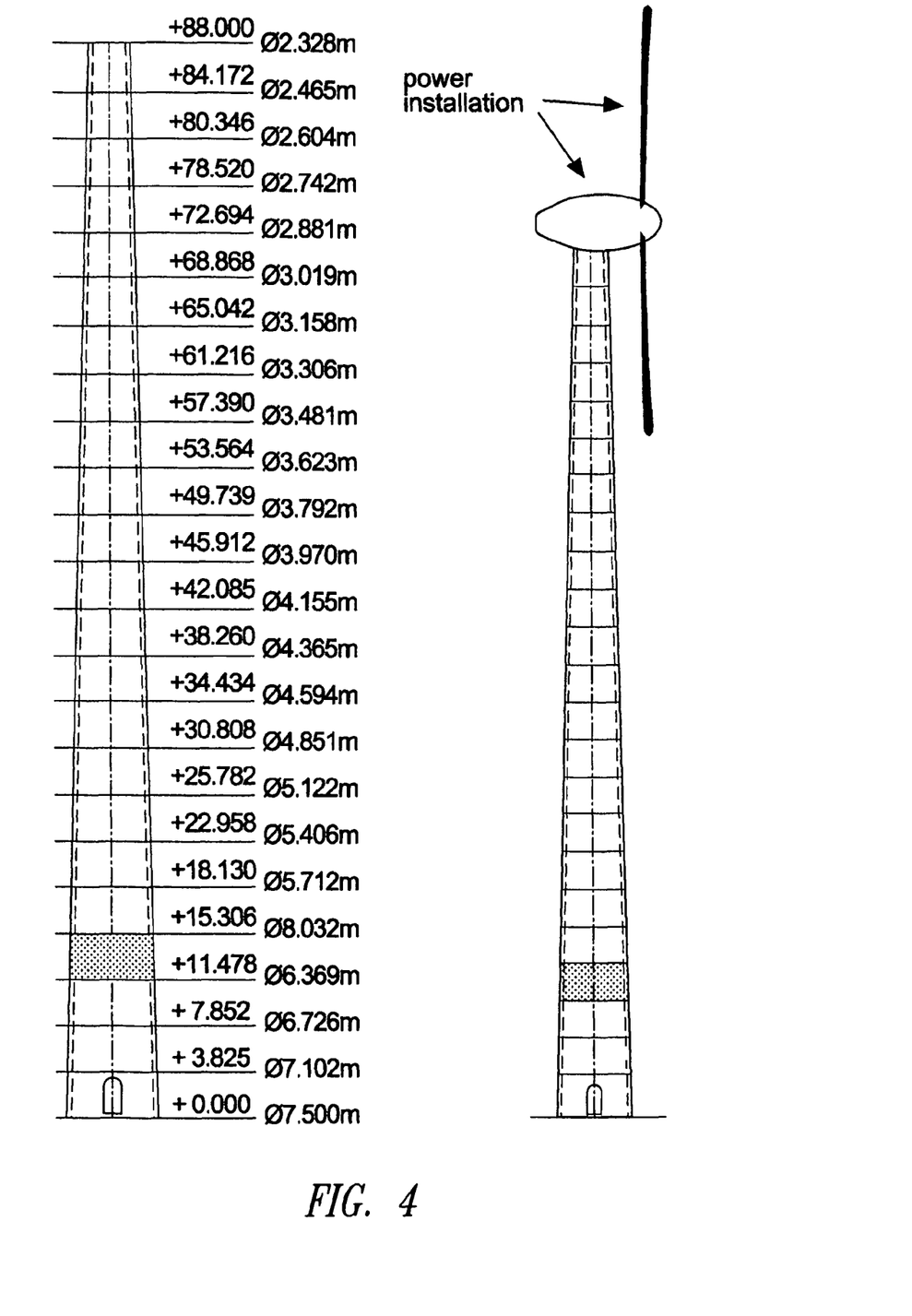
FIG. 4 shows a view of parts of two segments which are arranged one above the other and connected together in accordance with the invention and a complete pylon.

The seal 20 is arranged between two mutually superposed prestressed concrete finished elements 4, 6 (FIG. 3) in the region of mutually oppositely disposed jacket tubes 7 and is intended to provide a pressure-tight transition between jacket tubes 7 in the prestressed concrete finished elements 4, 6 (FIG. 3). In a preferred embodiment therefore the seal 20 is of a height of between about 25 mm and 30 mm.

That height consists of the height of the bead 22 and the height of the portion of the seal 20, whose cross-section tapers towards the smaller opening. In that arrangement, the height of the cantilever portion 23 indicates the intended spacing between the segments 4, 6 (FIG. 3). The upper portion 25 of the seal 20 which projects beyond that cantilever portion 23, with the tapering portion, is between about 10 mm and 15 mm higher.

When a pylon consisting of segments 4, 6 (FIG. 3) is erected that part of the seal 20, which projects beyond the cantilever portion 23, is pressed down by the segment 6 which is placed thereon and in turn presses with its resilient force against the segment 6. That produces a first sealing effect between the segments 4, 6, which even without pressure already being present in the interior of the seal, prevents the concrete slurry from escaping.

As the upper seal portion 25 is deformed by the segment 6 placed thereon, the transition 29 between the inner wall 27 and the outer wall 26 is so designed that it extends at an acute angle relative to the outer wall 26 and an obtuse angle relative to the inner wall 27 and thus substantially vertically.

This can be better seen in a circle shown on an enlarged scale for the sake of enhanced clarity. Here, only the transition 29 is illustrated, without adjoining edge lines, to improve the clarity aspect. Here, the acute angle between the outer wall 26 of the upper portion 25 of the seal 20 and the transition 29 as well as the obtuse angle between the wall 27 and the transition 29 can be clearly seen.

Even when the upper portion 25 of the seal 20 is pressed down horizontally, at the transition 29 between the inner wall 27 and the outer wall 26, the above-discussed arrangement provides a force which presses the seal 20 with its upper portion 25 more firmly against the segment 6, because even in this situation the transition 29 still has an upwardly extending surface.

If the upper segment 6 is assumed to have an approximately flat surface, then the upper portion 25 of the seal cannot be bent down further than into the horizontal. That means that at any event the seal 20 reliably provides for sealing integrity in relation to the upper segment 6.

FIG. 3 shows the apparatus 8 and the seal 20 inserted therein, in situ. Shown there are two mutually superposed segments 4, 6, of which the lower segment 4 is broken away in the region of the apparatus 8. The segments 4, 6 are arranged one above the other in such a way that the jacket tubes 7 in the segments 4, 6 are disposed in substantially aligned, mutually opposite relationship.

The apparatus 8 is inserted into the segment 4 in positively locking relationship therein and the top edge of the peripherally extending edge portion 18 terminates flush with the surface of the segment 4. The tubular portion 12 engages into the jacket tube 7 which is integrated in the segment 4.

The seal 20 is fitted into the part of the apparatus 8, which is provided for receiving the seal 20, and bears with its top side firmly against the upper segment 6.

When the pylon consisting of segments 4, 6 is erected with the method according to the invention, firstly preferably three spacers 32 are arranged distributed at approximately equal spacings around the periphery on the upwardly facing surface of the segment 4 which was the last one installed (being the lower segment).

The spacers 32 are preferably made of wood and are of a height of about 5 mm (depending on the surface roughness of the segments) which corresponds to the intended spacing 30 between the segments 4, 6 after assembly. The modulus of elasticity of wood is in a range which on the one hand permits wood to withstand the forces occurring in the pylon for some time, but which on the other hand provides that irregularities of the mutually oppositely disposed surfaces of the segments 4, 6 press into the wood and this therefore prevents the material of the segments 4, 6 from being chipped off.

In this case, levelling of the segments 4, 6 can be achieved by a suitable choice in respect of the height of the spacers, corresponding to the inevitable production inaccuracies of the segments 4, 6.

A joining material 34 is then applied to that surface in such a way as to cover it. In that respect, the positions at which the jacket tubes 7 in the segments 4, 6 or the jacket tube 7 in the upper segment 6 and the apparatus 8 with the seal 20 in the lower segment 4 are in mutually opposite relationship are cleared out when the material 34 is applied, by the material 34 being applied as far as the cantilever portion 23.

The joining material 34 which is applied to cover the surface involved is preferably an epoxy resin and is applied at least in a layer thickness of about 5 mm which substantially corresponds to the intended spacing 30 between the segments 4, 6.

The segment 6 which is next to be fitted is so placed on the lower segment 4 that the jacket tubes 7 are in alignment with each other. In that case the upper segment 6 is firstly supported on the three spacers 32 which transmit the forces between the segments 4, 6 until the material 34 has hardened.

To the extent to which the material 34 hardens, the transmission of force between the segments 4, 6 is increasingly effected by the material 34. As the strength properties of the material 34 in the hardened condition correspond to those of concrete, after the material 34 has hardened this arrangement provides a force-locking connection between the segments 4, 6 over the major part of the mutually facing surfaces of the segments 4, 6 (the regions of the transitions between the jacket tubes 7 remain cleared out).

After the material 34 has hardened all forces between the prestressed concrete finished elements 4, 6 are transmitted by the material 34 and the spacers 32 are no longer loaded.

As already described above, fitted on to the above-described prestressed concrete pylon is a steel attachment mounting on which then the entire machinery house of the wind power installation is mounted. The steel attachment mounting on the prestressed concrete pylon portion has at its underside a peripherally extending fixing flange. The steel attachment mounting is firstly fixed to a plurality of, for example four, screwthreaded bars until the definitive fixing is mounted in place. This involves the tensioning wires 13 which extend in the pylon also running through that flange and the tension strainers for the tensioning wires 13 being mounted in position above the flange.

If a ring element comprises a plurality of sub-segments (of a lengthwise portion) so that for example a sub-segment forms a semicircle in profile, those sub-segments are connected together. For that purpose, a so-called return-hanging reinforcement is incorporated when manufacturing the sub-segments. That returning-hanging reinforcement, a prolongation of the reinforcement which is incorporated in the segment, projects in a U-shape in a distributed manner out of the finished sub-segment at the ends thereof, above the height of the segment, in such a way that the elements which are visible at the ends are arranged crossbar-like one above the other.

In addition, provided in the oppositely disposed end of the adjacent sub-segment are (shallow) recesses, into which the return-hanging reinforcement can engage. Accordingly, in the installation situation, the return-hanging reinforcements of the adjacent sub-segments engage comb-like into each other. The transitions between the sub-segments of a lengthwise portion are then filled with a quick-setting concrete.

Figure 5:
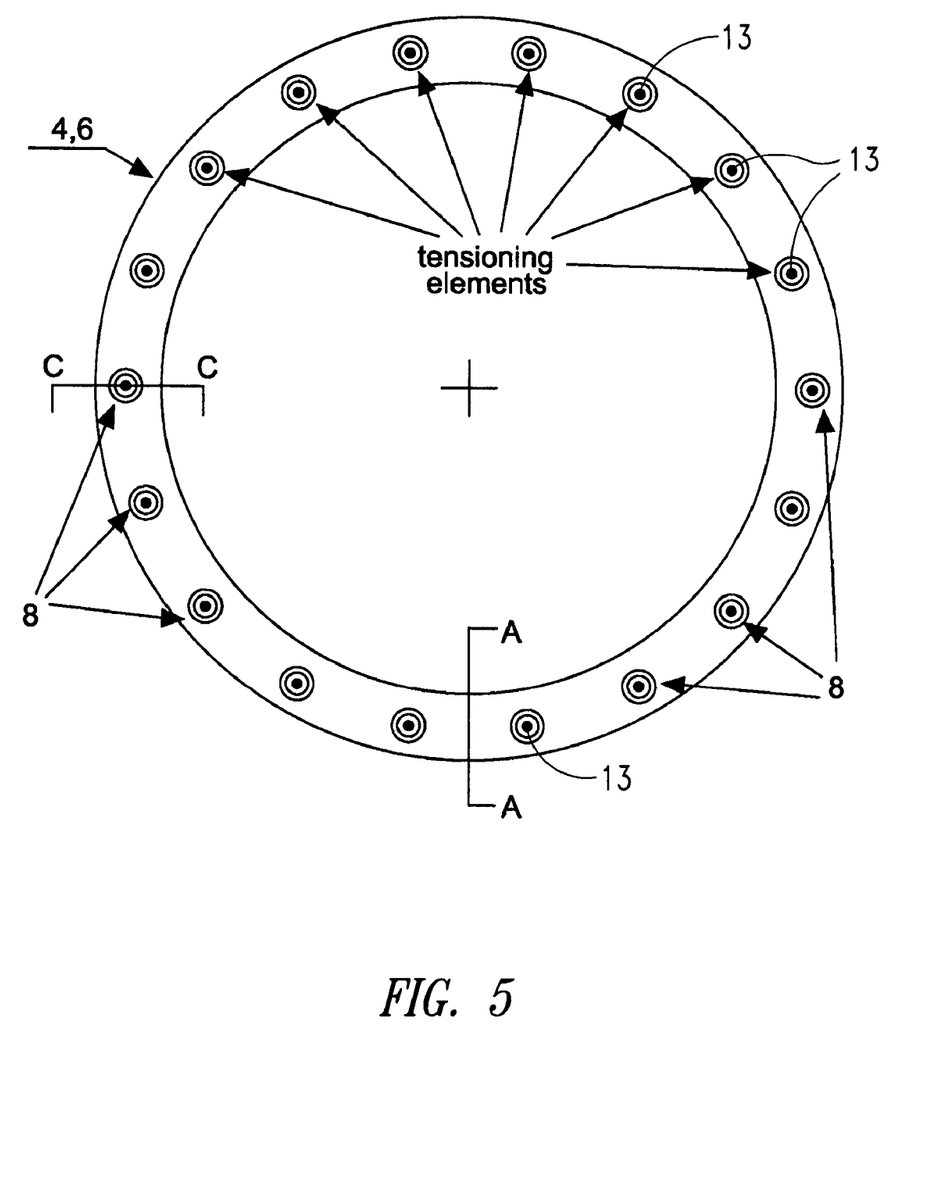
FIG. 5 shows a plan view of a full segment according to the invention.

FIG. 5 shows a plan view of a full segment according to the invention of a prestressed concrete pylon with the guide funnels 8. This Figure indicates two sections, namely A and C, which are shown in the subsequent Figures.

Figure 6:
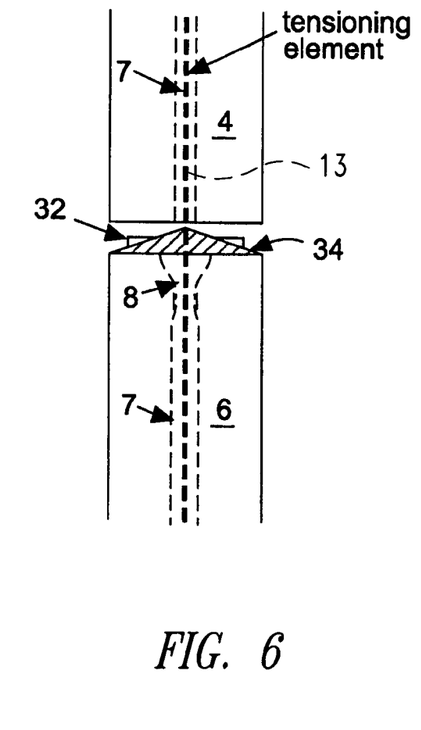
FIG. 6 shows a sectional view of a full segment according to the invention as shown in FIG. 5.

FIG. 6 shows a view in section A-A in FIG. 5 after preparation of the lower segment 6 but before the upper segment 4 is set in place. In this Figure and also in FIG. 7, guide funnels 8 and jacket tubes 7 in the segments 4, 6 are indicated in concealed fashion. Shown in the gap between the segments 4, 6 is a spacer 32 and the joining material 34 which is applied in that shape.

Figure 7:
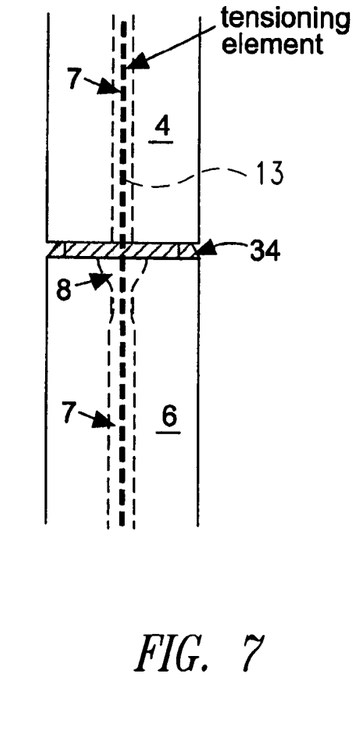
FIG. 7 shows segments in the installed position.

FIG. 7 shows the segments 4, 6 in the situation of installation thereof. The material 34 is substantially distributed over the width of the gap and the material 34 which bulges out laterally can be easily removed with a trowel or the like. The upper segment 4 rests on the spacer 32.

Figure 8:
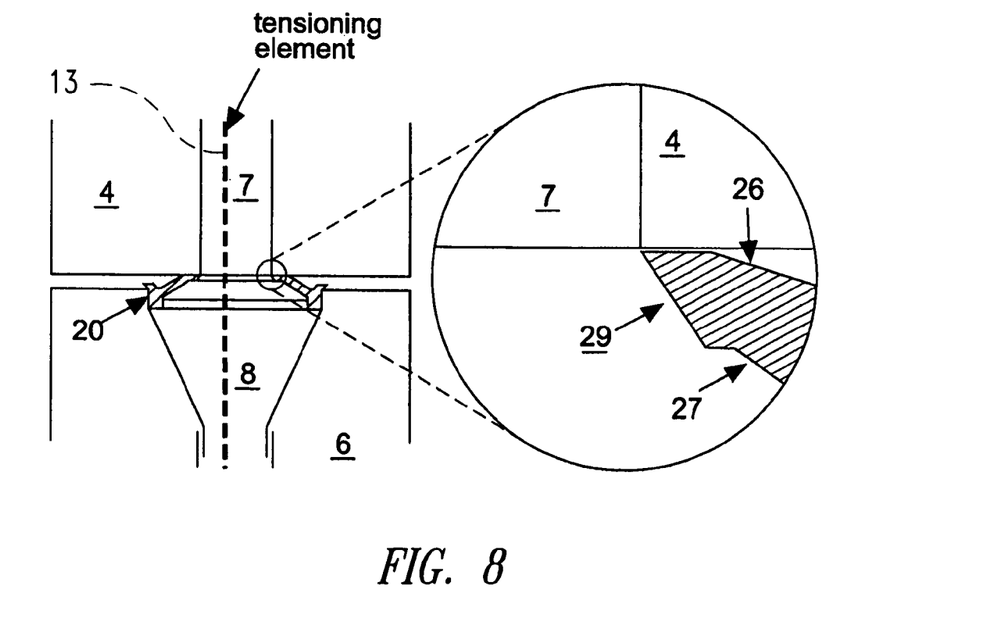
FIG. 8 shows a view in cross-section through a pylon according to the invention.

The seal 20 is not shown in these Figures for the sake of clarity. In order in this case also to clearly show the function of the seal 20, a section C-C in FIG. 5 is illustrated in FIG. 8. Here the joining material 34 and the spacers 32 have been omitted. The Figure shows how the seal 20 is pressed down by the upper segment 4, in the upper portion of the seal.

The part shown on an enlarged scale illustrates the fact that, even when an upper portion of the seal has been pressed down into the horizontal, the transition 29 extends upwardly due to the acute angle to the top side of the seal 20 and the obtuse angle of the underside 27 of the seal 20. When a pressure is applied in the interior of the seal, that portion is therefore reliably pressed against the upper segment 4.

FIG. 8 shows a view in cross-section through a pylon according to the invention, which in the illustrated example comprises 23 parts, wherein each part is substantially of a height of between 3.80 m and 4.00 m. As can be seen the pylon is of a tapering pylon profile, in other words, the pylon is wider at the ground than in the upper region of the pylon. In this case the pylon profile is overall curved, that is to say, the mutually oppositely disposed pylon walls are neither arranged parallel to each other nor are they arranged at a fixed angle relative to each other, but the profile or the outer contour is slightly curved. The figures beside the illustration of the pylon specify on the one hand the height of the lower surface of a pylon segment above the ground and the diameter of the pylon segment at that location (right-hand line of numbers). The figures are obviously given by way of example and are in no way to be interpreted as limiting the invention.

The invention claimed is:
1. A sealing arrangement comprising:
a first tower segment;
a second tower segment superposed with respect to the first tower segment along a longitudinal axis;
a seal longitudinally interposed between the first and second tower segments to seal a space therebetween, the seal including:
a central seal axis,
a lower end region sealingly coupled adjacent an upper region of the first tower segment and an upper end region sealingly coupled adjacent a lower region of the second tower segment,
a round cross-section with respect to the central seal axis,
an inner wall having an internal width and an outer wall having an external width, the inner and outer walls surrounding the central seal axis, and the internal and external widths decreasing substantially continuously from the lower end region to the upper end region a bead is formed thereon toward the lower end region of the seal, an outer peripheral edge of the seal above the bead has an outwardly directed cantilever portion located at an outermost periphery; and
a transition wall extending in a straight line from an upper terminal end of the inner wall to an upper terminal end of the outer wall, the transition wall extending substantially parallel to the central seal axis, and forming an acute angle with respect to the outer wall and an obtuse angle with respect to the inner wall.

2. The seal as set forth in claim 1 wherein said internal and external widths of the inner and outer walls of the seal change in an axial direction.

3. The seal as set forth in claim 1 wherein said internal and external widths increase towards one of the tower segments which is arranged beneath the seal.

4. The seal as set forth in claim 1 wherein a wall thickness of a material of the seal does not exceed a particular dimension.

5. The seal as set forth in claim 4 wherein the wall thickness of the seal material varies along a height of the seal.

6. The seal as set forth in claim 1 wherein an opening cross-section of the seal, which faces towards one of the tower segments disposed above the seal, is at least of same size as a tube incorporated into a wall of one of the tower segments.

7. The seal as set forth in claim 1 wherein a cross-sectional shape and dimensions of the bead substantially correspond to a cross-sectional shape of a mounting means of an apparatus formed by an outer peripheral edge of the apparatus, a support surface extending therefrom and an edge portion surrounding the support surface.

8. The seal as set forth in claim 1 wherein the cantilever portion is of a substantially parallelogram-shaped configuration.

9. The seal as set forth in claim 1 wherein an outer periphery of the seal decreases from the lower end region to the upper end region.

10. The seal as set forth in claim 1, wherein the internal width continuously decreases from the lower end region to the upper end region along a constant slope.

11. A sealing assembly comprising:
a first tower segment;
a second tower segment longitudinally superposed with respect to the first tower segment;
a seal positioned between the first and second tower segments to seal a space therebetween, the seal including:
a central seal axis,
a round lower end portion with a first circular opening therein, the first circular opening having a first internal diameter, a round upper end portion with a second circular opening therein, and separated from the lower end portion, the second circular opening having a second internal diameter that is less than the first internal diameter, an inner wall extending between the lower end portion and the upper end portion and around the central seal axis, the inner wall defining the first internal diameter at the lower end portion and defining the second internal diameter at the upper end portion, the inner wall having a diameter decreasing from the lower end portion to the upper end portion, a bead is formed thereon toward the lower end portion of the seal, an outer peripheral edge of the seal above the bead has an outwardly directed cantilever portion located at an outermost periphery, and an outer wall extending between the lower end portion and the upper end portion and around the central seal axis.

12. The seal of claim 11 wherein the upper end portion is separated from the lower end portion by a height, and wherein the first internal diameter decreases to the second internal diameter as a function of the height.

13. The seal of claim 11 wherein a first distance between the inner wall and the outer wall at the lower end portion is greater than a second distance between the inner wall and the outer wall at the upper end portion.

14. A seal assembly for comprising:

first and second tower segments having a longitudinal axis and being positioned with respect to each other along the longitudinal axis;

a seal sealing a space between the first and second tower segments and extending between an upper region of the first tower segment to a lower region of the second tower segment, the seal including:

a central seal axis, and a frustoconical body extending around the central seal axis, and having a first end adjacent the first tower segment, a second end, adjacent the second tower segment, an inner wall having an internal width, an outer wall having an external width, the inner wall forming an internal space, the inner and outer walls converging toward the central seal axis from the first tower segment to the second tower segment a ridge is formed thereon toward the lower end region of the seal, and an outer peripheral edge of the seal above the bead has an outwardly directed cantilever portion located at an outermost periphery.

15. The seal as set forth in claim 14, further comprising:

an extension portion extending away from the ridge and being coupled to the ridge toward one end of the extension portion.

16. The seal as set forth in claim 14 wherein the frustoconical body, the ridge and the extension portion extending away from the ridge, are formed from a unitary body of material.

17. The seal as set forth in claim 14 wherein the slope is constant.

18. The seal as set forth in claim 14, further comprising:

a transition wall extending in a straight line from an upper terminal end of the inner wall to an upper terminal end of the outer wall, the frustoconical body deforming in a region adjacent the transition wall, the transition wall extending substantially parallel to the central seal axis before being deformed, and converging toward the central axis from the upper terminal end of the lower wall to the upper terminal end of the outer wall.

* * * * *

UNITED STATES PATENT AND TRADEMARK OFFICE
CERTIFICATE OF CORRECTION

| | | |
|---|---|---|
| PATENT NO. | : 7,752,825 B2 | Page 1 of 1 |
| APPLICATION NO. | : 11/473863 | |
| DATED | : July 13, 2010 | |
| INVENTOR(S) | : Aloys Wobben | |

It is certified that error appears in the above-identified patent and that said Letters Patent is hereby corrected as shown below:

Title Page:

Item 62
"Division of application No. 10/332,690, filed on Sep. 30, 2003, now Pat. No. 7,114,295." should read as, --Division of application No. 10/332,690, filed as application No. PCT/EP01/08074 on Jul. 12, 2001, now Pat. No. 7,114,295.--.

Item 30
Should read as, --Jul. 12, 2000 (DE) 100 33 845.3--.

Column 10, Line 17
"from the lower end region to the upper end region a" should read as, --from the lower end region to the upper end region, a--.

Column 12, Line 12
"bead has an outwardly directed cantilever portion" should read as, --ridge has an outwardly directed cantilever portion--.

Signed and Sealed this
Fourteenth Day of June, 2011

David J. Kappos
*Director of the United States Patent and Trademark Office*